(12) United States Patent
Lim et al.

(10) Patent No.: US 11,050,446 B2
(45) Date of Patent: Jun. 29, 2021

(54) DEVICE AND METHOD FOR IMPROVING RADIATION PERFORMANCE OF ANTENNA USING IMPEDANCE TUNING

(71) Applicant: Samsung Electronics Co., Ltd., Gyeonggi-do (KR)

(72) Inventors: Wonsub Lim, Seoul (KR); Doil Ku, Gyeonggi-do (KR); Dongil Yang, Gyeonggi-do (KR); Hyoseok Na, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/609,680

(22) PCT Filed: Mar. 27, 2018

(86) PCT No.: PCT/KR2018/003615
§ 371 (c)(1),
(2) Date: Oct. 30, 2019

(87) PCT Pub. No.: WO2018/221847
PCT Pub. Date: Dec. 6, 2018

(65) Prior Publication Data
US 2020/0195283 A1 Jun. 18, 2020

(30) Foreign Application Priority Data

May 30, 2017 (KR) .................. 10-2017-0066971

(51) Int. Cl.
*H04B 1/04* (2006.01)
*H04B 17/12* (2015.01)
(52) U.S. Cl.
CPC ............... *H04B 1/04* (2013.01); *H04B 17/12* (2015.01)

(58) Field of Classification Search
CPC ........ H04B 1/04; H04B 17/12; H04B 1/0475; H04B 2001/0441; H04B 17/103
See application file for complete search history.

(56) References Cited

U.S. PATENT DOCUMENTS 9,065,530 B2    6/2015  Aymes et al.
2009/0253385 A1 10/2009 Dent et al.
(Continued)

FOREIGN PATENT DOCUMENTS

KR   10-2009-0123767 A   12/2009
KR     10-1176286 B1      8/2012
(Continued)

OTHER PUBLICATIONS

Korean Search Report dated Apr. 16, 2021.

*Primary Examiner* — Kabir A Timory
(74) *Attorney, Agent, or Firm* — Cha & Reiter, LLC

(57) ABSTRACT

An electronic device according to various embodiments of the present invention comprises: a transceiver; a power amplifier; at least one antenna; a coupler; a memory for storing reference phase information; and a processor. The processor may be configured to: transmit an output signal of a designated frequency band by using the transceiver; amplify the output signal by using the power amplifier, radiate the amplified output signal via the at least one antenna; acquire, via the coupler, the amplified output signal and a reflected signal that is the amplified output signal having been reflected from the at least one antenna; identify a reflection coefficient on the basis of the amplified output signal and the reflected signal; on the basis of phase information corresponding to the reflection coefficient, identify a difference value between the phase information corresponding to the reflection coefficient and reference phase information, among items of reference phase information, corresponding to the designated frequency band; and
(Continued)

compensate for another output signal to be transmitted through the transceiver, at least on the basis of the difference value. In addition, various embodiments are possible.

9 Claims, 11 Drawing Sheets

(56) References Cited

U.S. PATENT DOCUMENTS

| | | |
|---|---|---|
| 2009/0298446 A1 | 12/2009 | Yokoyama et al. |
| 2010/0239047 A1* | 9/2010 | Takayashiki .......... H03F 1/3247 375/296 |
| 2012/0026063 A1 | 2/2012 | Lee et al. |
| 2014/0266929 A1 | 9/2014 | Huynh et al. |
| 2016/0126619 A1* | 5/2016 | Tenbroek ................. H03H 7/40 343/745 |
| 2017/0264010 A1* | 9/2017 | Shi ....................... H04B 1/0458 |

FOREIGN PATENT DOCUMENTS

| | | |
|---|---|---|
| KR | 10-2013-0013702 A | 2/2013 |
| KR | 10-1543028 B1 | 8/2015 |
| KR | 10-2015-0143733 A | 12/2015 |
| KR | 10-2016-0016865 A | 2/2016 |

* cited by examiner

DEVICE AND METHOD FOR IMPROVING RADIATION PERFORMANCE OF ANTENNA USING IMPEDANCE TUNING

CROSS REFERENCE TO RELATED APPLICATIONS

This application is a National Phase Entry of PCT International Application No. PCT/KR2018/003615, which was filed on Mar. 27, 2018, and claims a priority to Korean Patent Application No. 10-2017-0066971, which was filed on May 30, 2017, the contents of which are incorporated herein by reference.

TECHNICAL FIELD

Various embodiments of the disclosure relate to a device and a method for improving radiation performance of an antenna using impedance tuning in an electronic device.

BACKGROUND ART

In a state where an electronic device (e.g., smart phone) is a finished product or a half-finished product (e.g., a product of which a rear cover is not attached thereto, and thus a wireless communication circuit (or a printed circuit board (PCB) mounted with the wireless communication circuit) is exposed to outside), calibration for improving the radiation performance and minimizing deviation from another electronic device may be performed. For example, the calibration may include conduction calibration for calibrating the characteristic of the wireless communication circuit so that a power satisfying a reference value is to be output through an antenna.

DISCLOSURE OF INVENTION

Technical Problem

Through a process of performing the conduction calibration with respect to products, it may be expected to improve an RF performance and to minimize the deviation between the products. However, in the wireless communication circuit, several components (e.g., impedance matching circuit, impedance tuner, and aperture tuner) may be mounted between antennas, and an RF performance deviation may occur due to an assembly deviation occurring when the components are mounted. For example, in the wireless communication circuit, the deviation of the maximum powers output to the antennas may be about 0.5 dB, whereas the deviation of the powers output to outside through the antennas may be about 2 to 4 dB. Accordingly, in the case of a specific product, the RF performance (e.g., total radiated power (TRP) or total isotropic sensitivity) may deteriorate, and thus the process capability index (cpk) standard may not be satisfied.

Various embodiments of the disclosure provide an electronic device having an improved RF performance. Further, according to various embodiments of the disclosure, the RF performance deviation between products may be minimized.

Solution to Problem

In an aspect of the disclosure, an electronic device may include a transceiver; a power amplifier; at least one antenna; a coupler; a memory configured to store reference phase information; and a processor, wherein the processor is configured to: transmit an output signal of a designated frequency band using the transceiver, amplify the output signal using the power amplifier, radiate the amplified output signal through the at least one antenna, acquire the amplified output signal and a reflected signal obtained in the case where the amplified output signal is reflected by the at least one antenna through the coupler, identify a reflection coefficient based on the amplified output signal and the reflected signal, identify a difference value from reference phase information corresponding to the designated frequency band among the reference phase information based on phase information corresponding to the reflection coefficient, and compensate for another output signal to be transmitted through the transceiver at least based on the difference value.

In another aspect of the disclosure, an electronic device may include an antenna; a coupler; a circuit configured to adjust an impedance between the antenna and the coupler; a wireless communication circuit; a memory configured to store reference compensation information including a plurality of domains and compensated values corresponding to the plurality of domains, respectively; and a processor, wherein the processor is configured to: calculate a reflection coefficient by acquiring, through the coupler, a signal output from the wireless communication circuit to the antenna and a signal reflected from the antenna, identify the domain corresponding to the reflection coefficient from the reference compensation information, identify the compensated value corresponding to the domain from the memory, and control the circuit using the compensated value.

In still another aspect of the disclosure, a method for compensating for a signal output to an antenna of an electronic device may include acquiring, through a coupler, phase information from a signal output from a transceiver of the electronic device to the antenna and a signal reflected by the antenna; identifying a difference value between the phase information and reference phase information stored in a memory; and compensating for another signal to be output from the transceiver to the antenna at least based on the difference value.

Advantageous Effects of Invention

Various embodiments of the disclosure can provide an electronic device having an improved RF performance. Further, according to the various embodiments, the RF performance deviation between products can be reduced. Accordingly, products satisfying the cpk standard can be provided.

MODE FOR THE INVENTION

Figure 1:
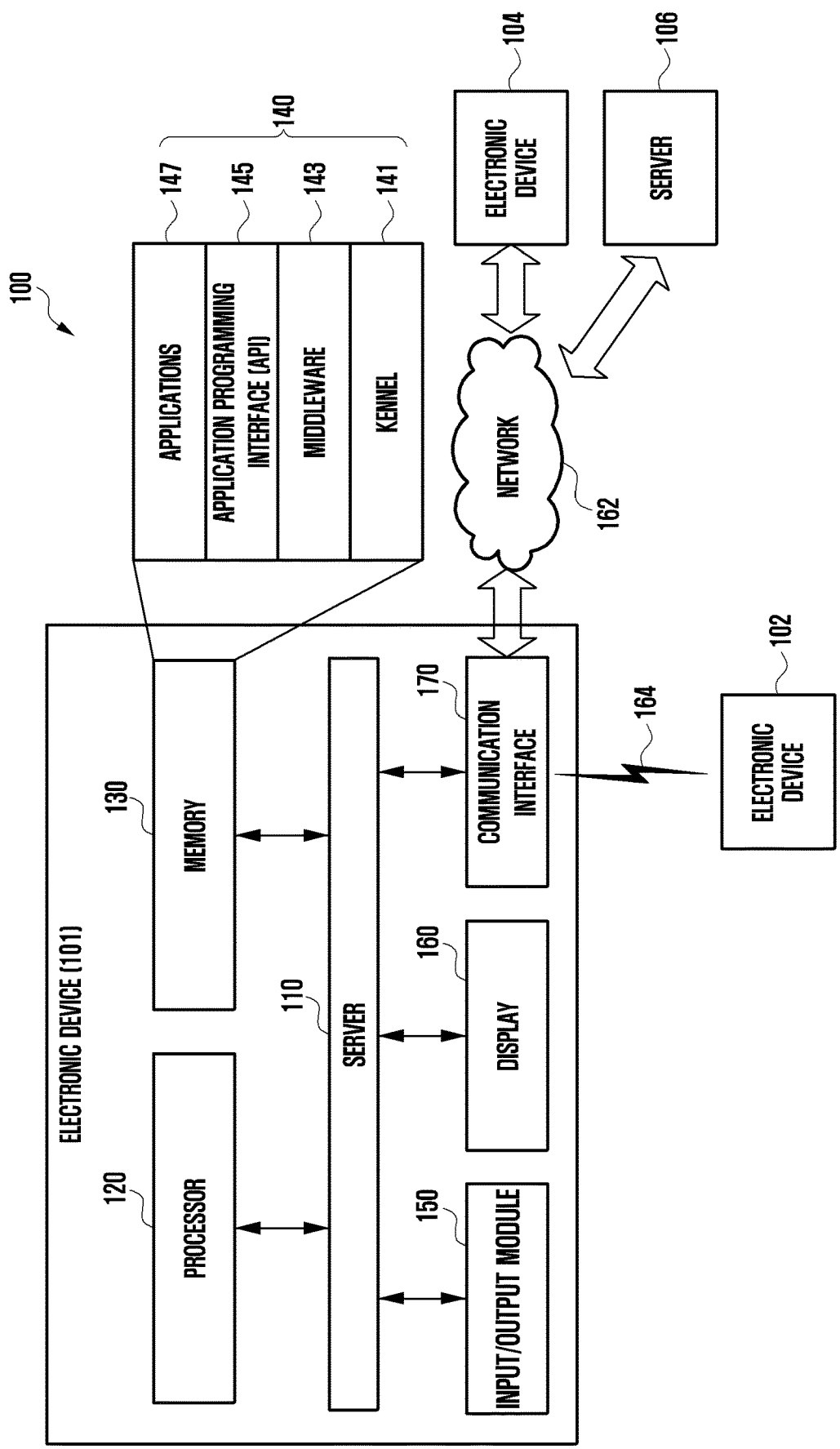
FIG. 1 is a diagram illustrating an electronic device in a network environment according to various embodiments.

Hereinafter, various embodiments will be described with reference to the accompanying drawings. The embodiments and the terms used therein are not intended to limit the technology disclosed herein to specific forms, and should be understood to include various modifications, equivalents, and/or alternatives of the corresponding embodiments. In describing the drawings, similar reference numerals may be used to designate similar constituent elements. A singular expression may include a plural expression unless they are definitely different in a context. As used herein, the expression "A or B" or "at least one of A and/or B" may include all possible combinations of items enumerated together. The expression "a first", "a second", "the first", or "the second" may modify various elements regardless of the order and/or the importance, and is used merely to distinguish one element from another element without limiting the corresponding elements. When an element (e.g., first element) is referred to as being "(functionally or communicatively) connected," or "directly coupled" to another element (second element), the element may be connected directly to the another element or connected to the another element through yet another element (e.g., third element).

The expression "configured to" as used in various embodiments may be interchangeably used with, for example, "suitable for", "having the capacity to", "adapted to", "made to", "capable of", or "designed to" in terms of hardware or software, according to circumstances. Alternatively, in some situations, the expression "device configured to" may mean that the device, together with other devices or components, "is able to". For example, the phrase "processor adapted (or configured) to perform A, B, or C" may mean a dedicated processor (e.g., embedded processor) only for performing the corresponding operations or a generic-purpose processor (e.g., central processing unit (CPU) or application processor (AP)) that can perform the corresponding operations by executing one or more software programs stored in a memory device.

An electronic device according to various embodiments may include at least one of, for example, a smart phone, a tablet personal computer (PC), a mobile phone, a video phone, an electronic book reader (e-book reader), a desktop PC, a laptop PC, a netbook computer, a workstation, a server, a personal digital assistant (PDA), a portable multimedia player (PMP), a MPEG-1 audio layer-3 (MP3) player, a mobile medical device, a camera, or a wearable device. The wearable device may include at least one of an accessory type (e.g., a watch, a ring, a bracelet, an anklet, a necklace, glasses, a contact lens, or a head-mounted device (HMD)), a fabric or clothing integrated type (e.g., an electronic clothing), a body-mounted type (e.g., a skin pad, or tattoo), or a bio-implantable type (e.g., an implantable circuit). In some embodiments, the electronic device may include at least one of, for example, a television, a digital video disk (DVD) player, an audio, a refrigerator, an air conditioner, a cleaner, an oven, a microwave oven, a washing machine, an air cleaner, a set-top box, a home automation control panel, a security control panel, a media box (e.g., Samsung HomeSync™, Apple TV™, or Google TV™), a game console (e.g., Xbox™ and PlayStation™), an electronic dictionary, an electronic key, a camcorder, or an electronic photo frame.

In other embodiments, the electronic device may include at least one of various medical devices (e.g., various portable medical measuring devices (a blood sugar measuring device, a heart rate monitoring device, a blood pressure measuring device, a body temperature measuring device, etc.), a magnetic resonance angiography (MRA), a magnetic resonance imaging (MRI), a computed tomography (CT) machine, and an ultrasonic machine), a navigation device, a global positioning system (GPS) receiver, an event data recorder (EDR), a flight data recorder (FDR), a vehicle infotainment devices, an electronic devices for a ship (e.g., a navigation device for a ship, and a gyro-compass), avionics, security devices, an automotive head unit, a robot for home or industry, an automatic teller's machine (ATM) in banks, point of sales (POS) in a shop, or internet device of things (e.g., a light bulb, various sensors, electric or gas meter, a sprinkler device, a fire alarm, a thermostat, a streetlamp, a toaster, a sporting tool, a hot water tank, a heater, a boiler, etc.). According to some embodiments, an electronic device may include at least one of a part of furniture or a building/structure, an electronic board, an electronic signature receiving device, a projector, and various types of measuring instruments (e.g., a water meter, an electric meter, a gas meter, a radio wave meter, and the like). In various embodiments, the electronic device may be flexible, or may be a combination of one or more of the aforementioned various devices. According to an embodiment, the electronic devices are not limited to those described above. In the disclosure, the term "user" may indicate a person using an electronic device or a device (e.g., an artificial intelligence electronic device) using an electronic device.

Referring to FIG. 1, an electronic device 101 within a network environment 100 according to various embodiments will be described. The electronic device 101 may include a bus 110, a processor 120, a memory 130, an input/output interface 150, a display 160, and a communication interface 170. In some embodiments, the electronic device 101 may omit at least one of the elements, or may further include another element. The bus 110 may include, for example, a circuit that interconnects the elements 110 to 170 and enables communication (for example, transmission of control messages or data) between the elements. The processor 120 may include one or more of a central processing unit, an application processor, and a communication processor (CP). The processor 120, for example, may carry out operations or data processing relating to the control and/or communication of at least one other element of the electronic device 101.

The memory 130 may include a volatile and/or non-volatile memory. The memory 130 may store, for example, instructions or data relating to at least one other element of the electronic device 101. According to an embodiment, the memory 130 may store software and/or a program 140. The program 140 may include a kernel 141, middleware 143, an application programming interface (API) 145, and/or application programs (or "applications") 147. At least some of the kernel 141, the middleware 143, and the API 145 may be referred to as an operating system. The kernel 141 may control or manage system resources (for example, the bus 110, the processor 120, or the memory 130) used for executing an operation or function implemented by other programs (for example, the middleware 143, the API 145, or the application 147). Furthermore, the kernel 141 may provide an interface through which the middleware 143, the API 145, or the application programs 147 can access the individual elements of the electronic device 101 to control or manage the system resources.

The middleware 143 may function as, for example, an intermediary for allowing the API 145 or the application programs 147 to communicate with the kernel 141 to exchange data. Furthermore, the middleware 143 may process one or more task requests, which are received from the application programs 147, according to priorities thereof. For example, the middleware 143 may assign priorities for using the system resources (for example, the bus 110, the processor 120, the memory 130, or the like) of the electronic device 101 to one or more of the application programs 147, and may process the one or more task requests. The API 145 is an interface through which the applications 147 control functions provided from the kernel 141 or the middleware 143, and may include, for example, at least one interface or function (for example, instruction) for file control, window control, image processing, or text control. For example, the input/output interface 150 may forward instructions or data, input from a user or an external device, to the other element(s) of the electronic device 101, or may output instructions or data, received from the other element(s) of the electronic device 101, to the user or an external device.

The display 160 may include, for example, a liquid crystal display (LCD), a light emitting diode (LED) display, an organic light emitting diode (OLED) display, a micro electro mechanical system (MEMS) display, or an electronic paper display. The display 160 may display, for example, various types of contents (e.g., text, images, videos, icons, or symbols) to the user. The display 160 may include a touch screen and may receive, for example, a touch, gesture, proximity, or hovering input using an electronic pen or the user's body part. The communication interface 170 may establish, for example, communication between the electronic device 101 and an external device (for example, a first external electronic device 102, a second external electronic device 104, or a server 106). For example, the communication interface 170 may be connected to a network 162 through wireless or wired communication to communicate with an external device (for example, the second external electronic device 104 or the server 106).

The wireless communication may include, for example, a cellular communication that uses at least one of LTE, LTE-Advanced (LTE-A), code division multiple access (CDMA), wideband CDMA (WCDMA), universal mobile telecommunications system (UMTS), wireless broadband (WiBro), global system for mobile communications (GSM), or the like. According to one embodiment, the wireless communication may include a short-range communication 164. For example, as indicated by reference numeral 164 in FIG. 1, the short-range communication 164 may include at least one of wireless fidelity (WiFi), light fidelity (LiFi), Bluetooth, bluetooth low energy (BLE), Zigbee, near field communication (NFC), magnetic secure transmission, radio frequency (RF), or body area network (BAN). According to an embodiment, the wireless communication may include, for example, at least one of wireless fidelity (WiFi), light fidelity (LiFi), Bluetooth, bluetooth low energy (BLE), Zigbee, near field communication (NFC), magnetic secure transmission, radio frequency (RF), or body area network (BAN). According to an embodiment, the wireless communication may include a global navigation satellite system (GNSS). The GNSS may be, for example, a global positioning system (GPS), a global navigation satellite system (GNSS), a Beidou navigation satellite system (hereinafter, referred to as "Beidou"), or Galileo (the European global satellite-based navigation system). Hereinafter, in this disclosure, the term "GPS" may be interchangeable with the term "GNSS". The wired communication may include, for example, at least one of a universal serial bus (USB), a high definition multimedia interface (HDMI), recommended standard 232 (RS-232), power line communication, or a plain old telephone service (POTS). The network 162 may include a telecommunications network, for example, at least one of a computer network (for example, a LAN or a WAN), the Internet, and a telephone network.

Each of the first and second external electronic devices 102 and 104 may be of the same as or a different type from the electronic device 101. According to various embodiments, all or some of the operations executed in the electronic device 101 may be executed in another electronic device or a plurality of other electronic devices (for example, the electronic devices 102 and 104 or the server 106). According to an embodiment, when the electronic device 101 has to perform some functions or services automatically or in response to a request, the electronic device 101 may make a request for performing at least some functions relating thereto to another device (for example, the electronic device 102 or 104 or the server 106) instead of performing the functions or services by itself or in addition. Another electronic device (for example, the electronic device 102 or 104, or the server 106) may execute the requested functions or the additional functions, and may deliver a result thereof to the electronic device 101. The electronic device 101 may provide the received result as it is, or may additionally process the received result to provide the requested functions or services. To this end, for example, cloud computing, distributed computing, or client-server computing technology may be used.

Figure 2:
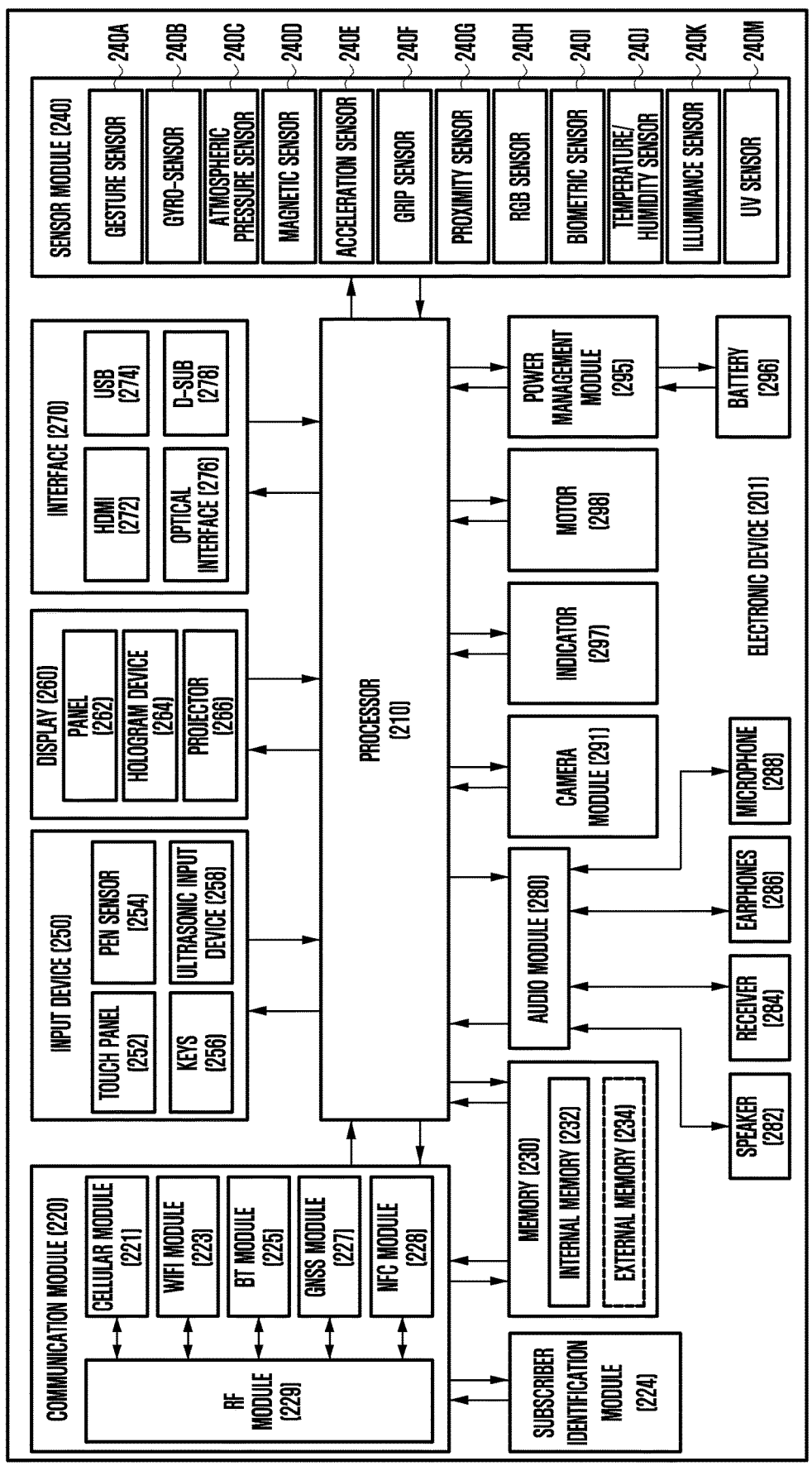
FIG. 2 is a block diagram of an electronic device according to various embodiments.

FIG. 2 is a block diagram of an electronic device 201 according to various embodiments. The electronic device 201 may include, for example, the whole or part of the electronic device 101 illustrated in FIG. 1. The electronic device 201 may include at least one processor 210 (for example, an AP), a communication module 220, a subscriber identification module 224, a memory 230, a sensor module 240, an input device 250, a display 260, an interface 270, an audio module 280, a camera module 291, a power management module 295, a battery 296, an indicator 297, and a motor 298. The processor 210 may control a plurality of hardware or software elements connected to the processor 210 and perform various data processing and operations by driving an operating system or an application program. The processor 210 may be implemented by, for example, a system on chip (SoC). According to an embodiment, the processor 210 may further include a graphic processing unit (GPU) and/or an image signal processor. The processor 210 may also include at least some of the elements illustrated in FIG. 2 (for example, a cellular module 221). The processor 210 may load, in volatile memory, instructions or data received from at least one of the other elements (for example, non-volatile memory), process the loaded instructions or data, and store the resultant data in the non-volatile memory.

The communication module 220 may have a configuration that is the same as, or similar to, that of the communication interface 170. The communication module 220 may include, for example, a cellular module 221, a Wi-Fi module 223, a Bluetooth module 225, a GNSS module 227, an NFC module 228, and an RF module 229. The cellular module 221 may provide, for example, a voice communication service, a video communication service, a text message service, an Internet service, or the like through a communication network. According to an embodiment, the cellular module 221 may identify and authenticate the electronic device 201 within a communication network using the subscriber identification module 224 (for example, a SIM card). According to an embodiment, the cellular module 221 may perform at least some of the functions that the processor 210 can provide. According to an embodiment, the cellular module 221 may include a communication processor (CP). In some embodiments, at least some (two or more) of the cellular module 221, the Wi-Fi module 223, the Bluetooth module 225, the GNSS module 227, or the NFC module 228 may be included in a single integrated chip (IC) or IC package. The RF module 229 may transmit or receive, for example, a communication signal (for example, an RF signal). The RF module 229 may include, for example, a transceiver, a power amplifier module (PAM), a frequency filter, a low noise amplifier (LNA), an antenna, or the like. According to another embodiment, at least one of the cellular module 221, the Wi-Fi module 223, the Bluetooth module 225, the GNSS module 227, and the NFC module 228 may transmit/receive an RF signal through a separate RF module. The subscriber identification module 224 may include, for example, a card that includes a subscriber identity module and/or an embedded SIM, and may contain unique identification information (for example, an integrated circuit card identifier (ICCID)) or subscriber information (for example, an international mobile subscriber identity (IMSI)).

The memory 230 (for example, the memory 130) may include, for example, an internal memory 232 or an external memory 234. The internal memory 232 may include, for example, at least one of a volatile memory (for example, a DRAM, an SRAM, an SDRAM, or the like) and a nonvolatile memory (for example, a one time programmable ROM (OTPROM), a PROM, an EPROM, an EEPROM, a mask ROM, a flash ROM, a flash memory, a hard disc drive, or a solid state drive (SSD)). The external memory 234 may include a flash drive, for example, a compact flash (CF), a secure digital (SD), a micro-SD, a mini-SD, an eXtreme digital (xD), a multi-media card (MMC), or a memory stick. The external memory 234 may be functionally and/or physically connected to the electronic device 201 through various interfaces.

The sensor module 240 may, for example, measure a physical quantity or detect the operating state of the electronic device 201 and convert the measured or detected information into an electrical signal. The sensor module 240 may include, for example, at least one of a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (for example, a red, green, blue (RGB) sensor), a biometric sensor 240I, a temperature/humidity sensor 240J, an illumination sensor 240K, or a ultraviolet (UV) sensor 240M. Additionally or alternatively, the sensor module 240 may include, for example, an e-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 240 may further include a control circuit for controlling one or more sensors included therein. In some embodiments, the electronic device 201 may further include a processor configured to control the sensor module 240 as a part of or separately from the processor 210, and may control the sensor module 240 while the processor 210 is in a sleep state.

The input device 250 may include, for example, a touch panel 252, a (digital) pen sensor 254, a key 256, or an ultrasonic input device 258. The touch panel 252 may employ, for example, at least one of a capacitive scheme, a resistive scheme, an infrared scheme, and an ultrasonic scheme. Furthermore, the touch panel 252 may further include a control circuit. The touch panel 252 may further include a tactile layer to provide a tactile reaction to a user. The (digital) pen sensor 254 may include, for example, a recognition sheet that is a part of, or separate from, the touch panel. The key 256 may include, for example, a physical button, an optical key, or a keypad. The ultrasonic input device 258 may detect ultrasonic waves, which are generated by an input tool, through a microphone (for example, a microphone 288) to identify data corresponding to the detected ultrasonic waves.

The display 260 (for example, the display 160) may include a panel 262, a hologram device 264, a projector 266, and/or a control circuit for controlling them. The panel 262 may be implemented to be, for example, flexible, transparent, or wearable. The panel 262, together with the touch panel 252, may be configured as one or more modules. According to an embodiment, the panel 262 may include a pressure sensor (or a POS sensor) which may measure a strength of pressure of a user's touch. The pressure sensor may be implemented integrally with the touch panel 252 or as one or more sensors separate from the touch panel 252. The hologram device 264 may show a three-dimensional image in the air by using an interference of light. The projector 266 may display an image by projecting light onto a screen. The screen may be located, for example, at the inside of outside of the electronic device 201. The interface 270 may include, for example, an HDMI 272, a USB 274, an optical interface 276, or a D-subminiature (D-sub) 278. The interface 270 may be included in, for example, the communication interface 170 illustrated in FIG. 1. Additionally or alternatively, the interface 270 may, for example, include a mobile high-definition link (MHL) interface, a secure digital (SD) card/multi-media card (MMC) interface, or an infrared data association (IrDA) standard interface.

The audio module 280 may convert, for example, sound into an electrical signal, and vice versa. At least some elements of the audio module 280 may be included, for example, in the input/output interface 145 illustrated in FIG. 1. The audio module 280 may process sound information that is input or output through, for example, a speaker 282, a receiver 284, an earphone 286, the microphone 288, and the like.

The camera module 291 is a device that can photograph a still image and a moving image. According to an embodiment, the camera module 291 may include one or more image sensors (for example, a front sensor or a rear sensor), a lens, an image signal processor (ISP), or a flash (for example, an LED or xenon lamp).

The power management module 295 may manage, for example, the power of the electronic device 201. According to an embodiment, the power management module 295 may include a power management integrated circuit (PMIC), a charger IC, or a battery or fuel gauge. The PMIC may use a wired and/or wireless charging method. Examples of the wireless charging method may include a magnetic resonance method, a magnetic induction method, an electromagnetic wave method, and the like. Additional circuits (for example, a coil loop, a resonance circuit, a rectifier, and the like) for wireless charging may be further included. The battery gauge may measure, for example, the residual amount of the battery 296 and a voltage, current, or temperature while charging.

The battery 296 may include, for example, a rechargeable battery and/or a solar battery.

The indicator 297 may display a particular state, for example, a booting state, a message state, a charging state, or the like of the electronic device 201 or a part (for example, the processor 210) of the electronic device 201. The motor 298 may convert an electrical signal into a mechanical vibration and may generate a vibration, a haptic effect, or the like. The electronic device 201 may include a mobile TV support device that can process media data according to a standard, such as digital multimedia broadcasting (DMB), digital video broadcasting (DVB), mediaFlo™, and the like. Each of the above-described component elements of hardware according to the disclosure may include one or more elements, and the names of the corresponding elements may change based on the type of electronic device. In various embodiments, an electronic device (for example, the electronic device 201) may omit some elements or may further include additional elements, or some of the elements of the electronic device may be combined with each other to configure one entity, in which case the electronic device may identically perform the functions of the corresponding elements prior to the combination.

Figure 3:
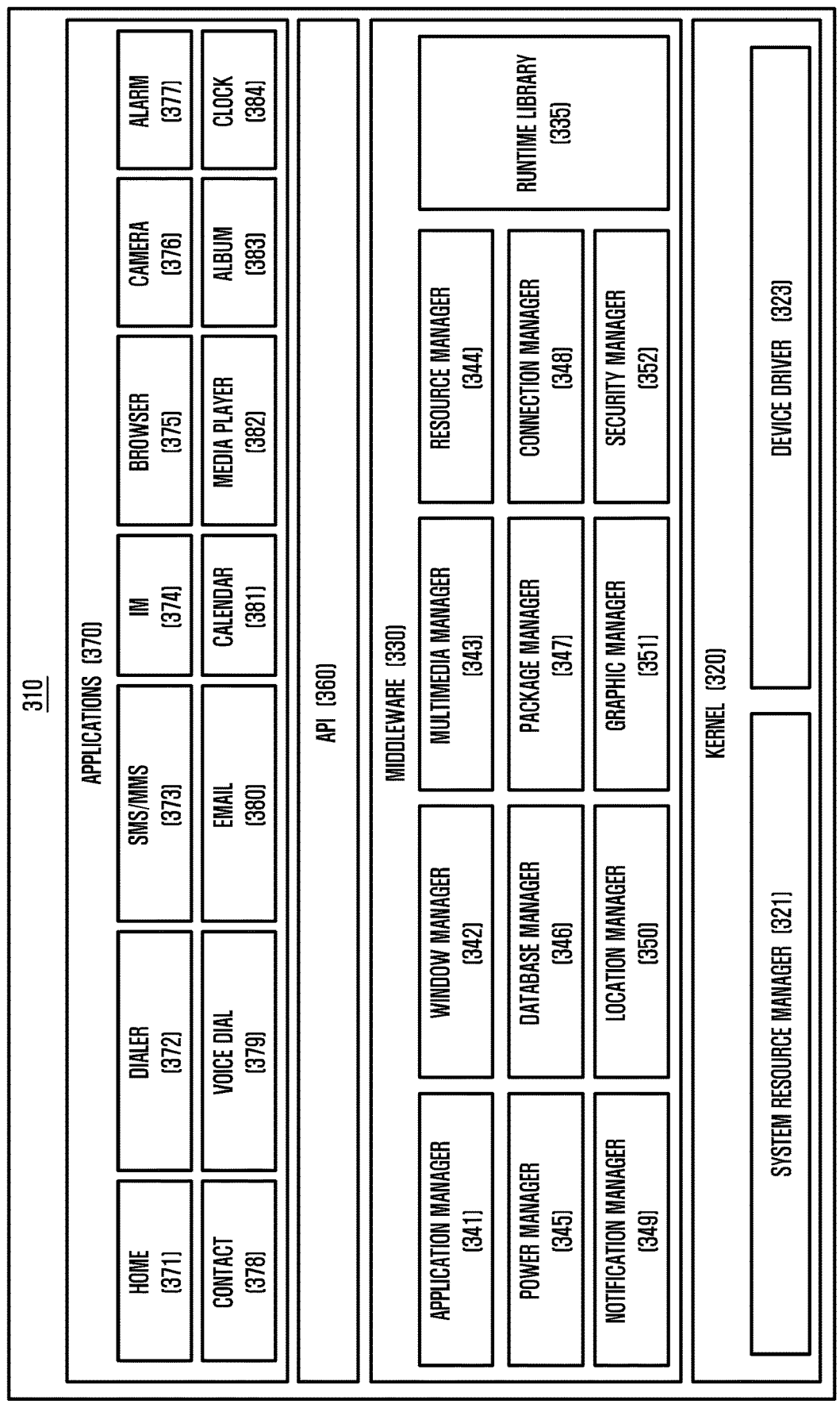
FIG. 3 is a block diagram of a program module according to various embodiments.

FIG. 3 is a block diagram of a program module according to various embodiments. According to an embodiment, the program module 310 (for example, the program 140) may include an operating system (OS) that controls resources relating to an electronic device (for example, the electronic device 101) and/or various applications (for example, the application programs 147) that are driven on the operating system. The operating system may include, for example, Android™, iOS™, Windows™, Symbian™, Tizen™, or Bada™. Referring to FIG. 3, the program module 310 may include a kernel 320 (for example, the kernel 141), middleware 330 (for example, the middleware 143), an API 360 (for example, the API 145), and/or applications 370 (for example, the application programs 147). At least a part of the program module 310 may be preloaded on the electronic device, or may be downloaded from an external electronic device (for example, the electronic device 102 or 104 or the server 106).

The kernel 320 may include, for example, a system resource manager 321 and/or a device driver 323. The system resource manager 321 may control, allocate, or retrieve system resources. According to an embodiment, the system resource manager 321 may include a process manager, a memory manager, or a file system manager. The device driver 323 may include, for example, a display driver, a camera driver, a Bluetooth driver, a shared memory driver, a USB driver, a keypad driver, a Wi-Fi driver, an audio driver, or an inter-process communication (IPC) driver. The middleware 330 may provide, for example, a function required by the applications 370 in common, or may provide various functions to the applications 370 through the API 360 such that the applications 370 can efficiently use limited system resources within the electronic device. According to an embodiment, the middleware 330 may include at least one of a runtime library 335, an application manager 341, a window manager 342, a multi-media manager 343, a resource manager 344, a power manager 345, a database manager 346, a package manager 347, a connectivity manager 348, a notification manager 349, a location manager 350, a graphic manager 351, and a security manager 352.

The runtime library 335 may include, for example, a library module that a compiler uses in order to add a new function through a programming language while the application 370 is being executed. The runtime library 335 may perform an input/output, manage a memory, or process an arithmetic function. The application manager 341 may manage, for example, the life cycle of the application 370. The window manager 342 may manage GUI resources used for a screen. The multimedia manager 343 may identify formats required for reproducing various media files and may encode or decode a media file using a codec suitable for the corresponding format. The resource manager 344 may manage the source code of the application 370 or the space in memory. The power manager 345 may manage, for example, battery capacity, temperature, or power, and may determine or provide power information required for the operation of the electronic device based on corresponding information. According to an embodiment, the power manager 345 may operate in conjunction with a basic input/output system (BIOS). The database manager 346 may, for example, generate, search, or change databases to be used by the application 370. The package manager 347 may manage the installation or update of an application that is distributed in the form of a package file.

The connectivity manager 348 may manage, for example, a wireless connection. The notification manager 349 may provide information on an event (for example, an arrival message, an appointment, a proximity notification, or the like) to a user. The location manager 350 may manage, for example, the location information of the electronic device. The graphic manager 351 may manage a graphic effect to be provided to a user and a user interface relating to the graphic effect. The security manager 352 may provide, for example, system security or user authentication. According to an embodiment, the middleware 330 may include a telephony manager for managing a voice or video call function of the electronic device or a middleware module that is capable of forming a combination of the functions of the above-described elements. According to an embodiment, the middleware 330 may provide specialized modules according to the types of operation systems. Furthermore, the middleware 330 may dynamically remove some of the existing elements, or may add new elements. The API 360 is, for example, a set of API programming functions, and may be provided while having different configurations depending on the operating system. For example, in the case of Android or iOS, one API set may be provided for each platform, and in the case of Tizen, two or more API sets may be provided for each platform.

The application 370 may include, for example, a home 371, dialer 372, short message service (SMS)/multimedia messaging service (MMS) 373, instant message (IM) 374, browser 375, camera 376, alarm 377, contact 378, voice dial 379, email 380, calendar 381, media player 382, album 383, watch 384, health care (e.g., for measuring the degree of workout or biometric information, such as blood sugar), or environmental information (e.g., for measuring air pressure, humidity, or temperature information) application. According to an embodiment, the applications 370 may include an information exchange application that can support the exchange of information between the electronic device and an external electronic device. The information exchange application may include, for example, a notification relay application for relaying particular information to an external electronic device or a device management application for managing an external electronic device. For example, the notification relay application may relay notification information generated in the other applications of the electronic device to an external electronic device, or may receive notification information from an external electronic device to provide the received notification information to a user. The device management application may perform turn-on or turn-off of the function of an external electronic device communicating with the electronic device (e.g. the external electronic device itself or some elements thereof) or adjust the brightness of (or resolution) of a display thereof, or may install, delete, or update an application running on the external electronic device. According to an embodiment, the application 370 may include applications (for example, a health care application of a mobile medical appliance) that are designated according to the attributes of an external electronic device. According to an embodiment, the application 370 may include applications received from an external electronic device. At least a part of the program module 310 may be implemented (for example, executed) by software, firmware, hardware (for example, the processor 210), or a combination of two or more thereof and may include a module, a program, a routine, an instruction set, or a process for performing one or more functions.

The term "module" as used herein may include a unit including hardware, software, or firmware, and may, for example, be used interchangeably with the term "logic", "logical block", "component", "circuit", or the like. The "module" may be an integrated element, or a minimum unit for performing one or more functions or a part thereof. The "module" may be mechanically or electronically implemented and may include, for example, an application-specific integrated circuit (ASIC) chip, a field-programmable gate arrays (FPGA), or a programmable-logic device, which has been known or are to be developed in the future, for performing certain operations. At least some of devices (e.g., modules or functions thereof) or methods (e.g., operations) according to various embodiments may be implemented by an instruction which is stored a computer-readable storage medium (e.g., the memory 130) in the form of a program module. The instruction, when executed by a processor (e.g., the processor 120), may cause the one or more processors to execute the function corresponding to the instruction. The computer-readable storage medium may include a hard disk, a floppy disk, a magnetic medium (e.g., a magnetic tape), an optical media (e.g., CD-ROM, DVD), a magneto-optical media (e.g., a floptical disk), an inner memory, etc. The instruction may include a code made by a complier or a code that can be executed by an interpreter. The programming module according to the disclosure may include one or more of the aforementioned components or may further include other additional components, or some of the aforementioned components may be omitted. Operations performed by a module, a programming module, or other elements according to various embodiments may be executed sequentially, in parallel, repeatedly, or in a heuristic manner. At least some operations may be executed according to another sequence, may be omitted, or may further include other operations.

Figure 4:
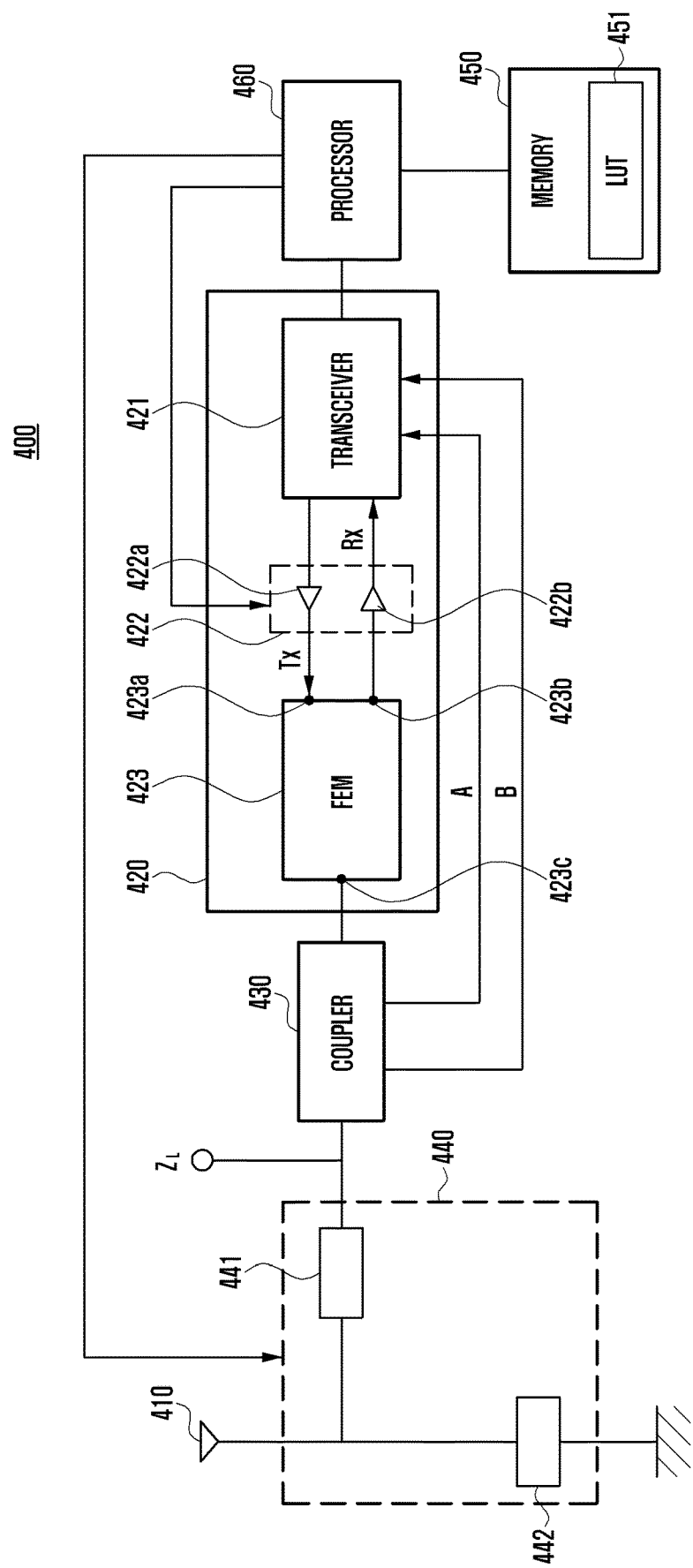
FIG. 4 is a block diagram illustrating the configuration for improving radiation performance of an antenna in an electronic device according to various embodiments.

FIG. 4 is a block diagram illustrating the configuration for improving radiation performance of an antenna in an electronic device according to various embodiments.

With reference to FIG. 4, an electronic device 400 according to various embodiments of the disclosure may include, for example, the whole or a part of the electronic device 101 illustrated in FIG. 1 or the electronic device 201 illustrated in FIG. 2.

The electronic device according to various embodiments of the disclosure may include an antenna 410, a wireless communication circuit 420 (e.g., communication module 220), a coupler 430, a matching circuit 440, a memory 450 (e.g., memory 230), and a processor 460 (e.g., processor 210).

The wireless communication circuit 420 according to various embodiments of the disclosure may include a transceiver 421, an amplification module 422, and a front end module 423.

The transceiver 421 according to various embodiments of the disclosure may convert data received from the processor 460 into an RF signal (e.g., transmission (Tx) signal), and it may output the converted RF signal to the front end module 423 through the power amplification module 422 (e.g., power amplifier (PAM)). Further, the transceiver may convert the RF signal (e.g., received (Rx) signal) received from the front end module 423 into digital data that can be decrypted by the processor to transfer the digital data to the processor 460.

The amplification module 422 according to various embodiments of the disclosure may include a power amplifier 422a and a low-noise amplifier 422b. The power amplifier 422a may amplify the RF signal (e.g., Tx signal) received from the transceiver 421, and it may transmit the amplified RF signal to the front end module 423. The low-noise amplifier 422b may amplify the RF signal (e.g., Rx signal) received from the antenna 410 through the front end module 423 with the minimum noise, and it may transmit the amplified RF signal to the transceiver 421. According to an embodiment, the amplification rate of the power amplifier 422a or the low noise amplifier 422b may be determined by the level of a DC power (voltage or current) that is an energy source. Further, the amplification rate may be changed through adjustment of the level of the DC power (voltage or current) by the processor 460.

The front end module 423 according to various embodiments of the disclosure may include a duplexer and/or a diplexer to separate and output the transmitted and received signals. That is, the front end module 423 may output the RF signal (e.g., Tx signal) received from the transceiver 421 through an input port 423a to the antenna 410 through an input/output port 423c, and it may output the RF signal (e.g., Rx signal) received from the antenna 410 through the input/output port 423c to the transceiver 421 through the output port 423b.

The coupler 430 according to various embodiments of the disclosure may perform power sampling. For example, the coupler 430 may extract a forward coupling signal A having the same wavelength and a power that is lower than the power of the RF signal (e.g., if the power of the RF signal is 0 dBm, the power of the forward coupling signal is −30 dBm) from the RF signal output from the input/output port 423c to the antenna 410, and it may transfer the extracted forward coupling signal to the transceiver. Meanwhile, due to the impedance difference between the antenna 410 and the front end module 423, the RF signal is not radiated completely (without any power loss) through the antenna 410, but a return loss occurs in the RF signal. That is, if the RF signal is output from the front end module 423 to the antenna 410, a reflected signal is generated due to the impedance difference between the antenna 410 and the front end module 423 to be transferred to the front end module 423. The coupler 430 may extract a reverse coupling signal B having the same wavelength and a power that is lower than the power of the reflected signal (e.g., if the power of the reflected is 0 dBm, the power of the reverse coupling signal is −30 dBm) from the reflected signal as described above, and it may transfer the extracted reverse coupling signal to the transceiver 421. The transceiver 421 may output values (e.g., power values or voltage values) corresponding to the forward coupling signal and the reverse coupling signal, respectively.

The matching circuit 440 according to various embodiments of the disclosure is to minimize the return loss, and it may be provided between the antenna 410 and the front end module 423. For example, the matching circuit 440 may be a lumped element, and it may include at least one of a register, an inductor, or a capacitor. Further, the matching circuit 440 may be a distributed element, and it may include a strip line.

Further, the matching circuit 440 may further include a circuit configured to minimize the return loss by adjusting (or tuning or transforming) a load impedance (e.g., impedance $Z_L$ between the antenna 410 and the coupler 430) to be maximally adjacent to the characteristic impedance. For example, the matching circuit 440 may further include an impedance tuner 441 and an aperture tuner 442. Here, the impedance tuner 441 may minimize the reflection due to the impedance difference between the antenna 410 and the front end module 423 through adjustment of an electrical length (e.g., capacitance, inductance, or resistance) between the antenna 410 and the front end module 423. The aperture tuner 442 may change a resonance frequency through adjustment of the electrical length between the antenna 410 and ground. Through the change of such a resonance frequency, the reflection due to the impedance difference between the antenna 410 and the front end module 423 may be minimized. In addition, the matching circuit 440 may further include a microelectromechanical systems (MEMS) tuner as a means for impedance tuning.

The memory 450 according to various embodiments of the disclosure may store therein a compensation value for adjusting (or tuning or transforming) a load impedance ($Z_L$) to be maximally adjacent to the characteristic impedance (e.g., 50 ohms).

According to an embodiment, a lookup table (LUT) 451 may include base plot domains (reference compensation information) and compensation values corresponding to the base plot domains. In the reference compensation information, each domain may be a region designated to correspond to a partial region of the whole region of a Smith chart. The reference compensation information may include the reflection coefficient corresponding to each domain and/or the corresponding load impedance (R+jX: the real part R denotes resistance and the imaginary part X denotes reactance).

According to an embodiment, the base plot domain and the corresponding compensation value may be optimized to a reference set. Accordingly, in the case of applying the compensation value optimized to the reference set to the matching circuit, the load impedance ($Z_L$) of a certain product may converge into a specific impedance to minimize the return loss, whereas the load impedance of another product may not converge into the specific impedance to cause a problem in the radiation performance. For example, the load impedance may be replaced by a reflection coefficient having a magnitude and a phase through the Smith chart, and in this case, a radiation performance deviation may occur due to a phase shift.

According to an embodiment, the lookup table 451 may further include a reference value (reference phase information) for compensation for the phase shift. For example, the reference value may include a reflection coefficient measured for each transmission (Tx) channel (e.g., for each frequency band) in the reference set and/or the corresponding impedance.

For example, the processor 460 according to various embodiments of the disclosure may be the cellular module 221 as illustrated in FIG. 2, the processor 210, a communication processor, or an application processor. The processor 460 may be electrically connected to other constituent elements (e.g., the matching circuit 440, the power amplification module 422, or the transceiver 421) to control the constituent elements, and it may perform processing and operation of various kinds of data.

The processor 460 according to various embodiments of the disclosure may calculate the reflection coefficient of the antenna 410 and it may acquire the phase value using values corresponding to a forward coupling signal and a backward coupling signal, respectively, received from the transceiver 421. The processor 460 may obtain the phase difference (e.g., phase difference from the reference set) through comparison of the acquired phase value with the reference value (reference phase information) recorded in the lookup table 451.

The phase difference (i.e., RF performance deviation from the reference set) may be compensated for in various embodiments.

According to an embodiment, the processor 460 may perform radiation calibration of the reference compensation information (base plot domains) to suit the corresponding set (i.e., electronic device 400) through shifting of respective phases of the base plot domains as much as the phase difference. After performing the radiation calibration, the processor 460 may calculate the reflection coefficient of the antenna 410, identify the domain corresponding to the calculated reflection coefficient (e.g., including a location where the reflection coefficient is plotted) from the calibrated reference compensation information, and acquire the corresponding compensation value from the lookup table 451. The processor 460 may control the matching circuit 440 (e.g., impedance tuner 441 and/or aperture tuner 442) using the compensation value to adjust (or tune or transform) the load impedance $Z_L$ to converge into the characteristic impedance.

Meanwhile, the radiation calibration according to an embodiment may be pre-performed. Accordingly, the processor 460 may calculate the reflection coefficient of the antenna 410 using the values corresponding to the forward coupling signal and the backward coupling signal, which are received from the transceiver 421. The processor 460 may adjust (or tune or transform) the load impedance $Z_L$ to converge into the characteristic impedance by identifying the domain corresponding to the calculated reflection coefficient among the calibrated base plot domains recorded in the lookup table 451, reading the corresponding compensation value from the lookup table 451, and controlling the matching circuit 440 (e.g., impedance tuner 441 and/or aperture tuner 442) using the read compensation value.

According to another embodiment, the processor 460 may perform the radiation calibration so that the load impedance $Z_L$ converges into the load impedance of the reference set by controlling the matching circuit 440 (e.g., impedance tuner 441 and/or aperture tuner 442) using the reflection coefficient. After performing the radiation calibration, the processor 460 may adjust (or tune or transform) the load impedance $Z_L$ to converge into the characteristic impedance by calculating the reflection coefficient of the antenna 410, reading, from the lookup table 451, the compensation value corresponding to the domain corresponding to (or including) the reflection coefficient among the base plot domains recorded on the lookup table 451, and controlling the matching circuit 440 (e.g., impedance tuner 441 and/or aperture tuner 442) using the read compensation value.

Meanwhile, the radiation calibration according to another embodiment may be pre-performed. That is, the compensation value recorded in the lookup table 451 may be optimized to not only the reference set but also the electronic device 400. Accordingly, the processor 460 may calculate the reflection coefficient of the antenna 410 using the values corresponding to the forward coupling signal and the backward coupling signal, which are received from the transceiver 421. The processor 460 may adjust (or tune or transform) the load impedance $Z_L$ to converge into the characteristic impedance by reading the compensation value corresponding to the calculated reflection coefficient from the lookup table 451, and controlling the matching circuit 440 (e.g., impedance tuner 441 and/or aperture tuner 442) using the read compensation value.

Figure 5A:
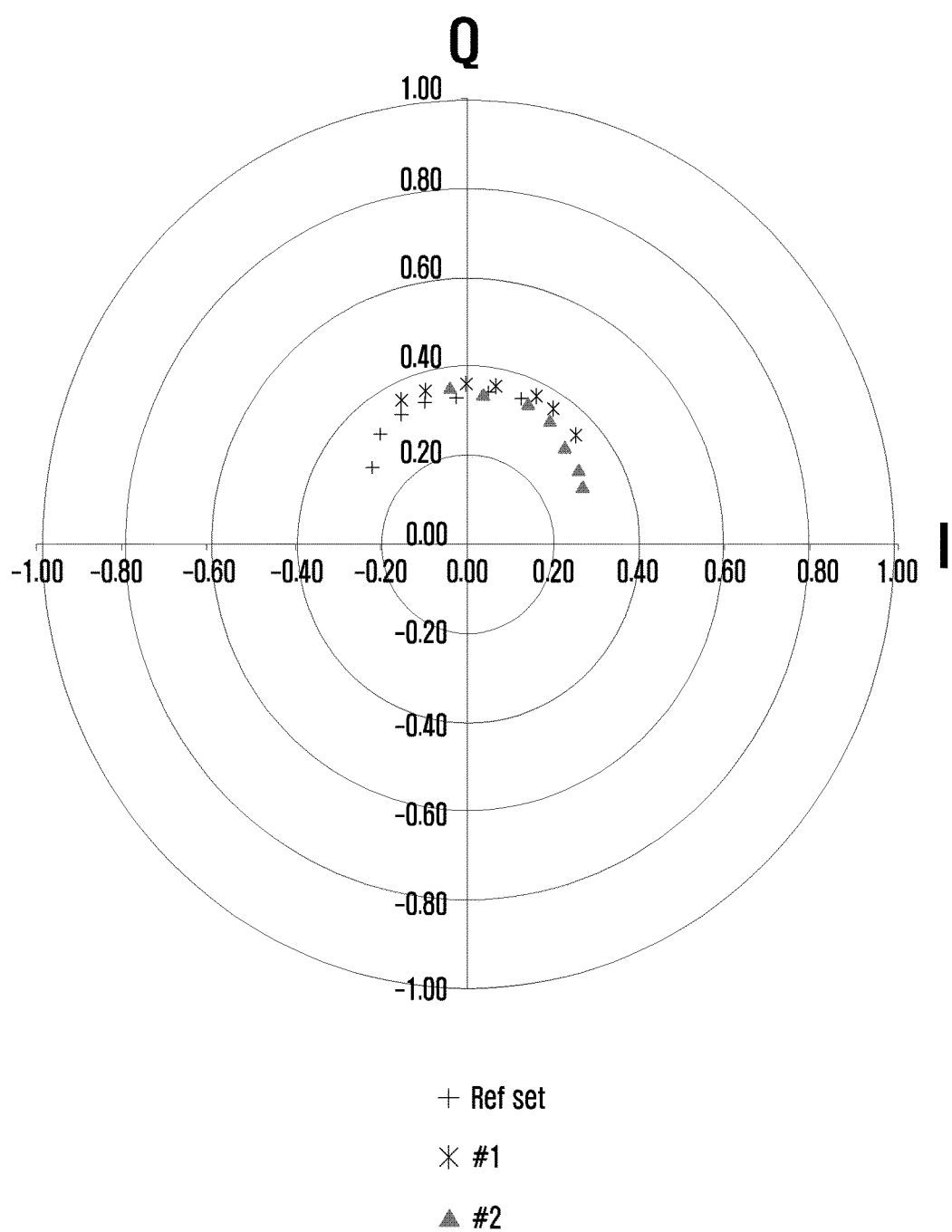
FIG. 5A is a diagram illustrating that reflection coefficients are plotted on a Smith chart.
Figure 5B:
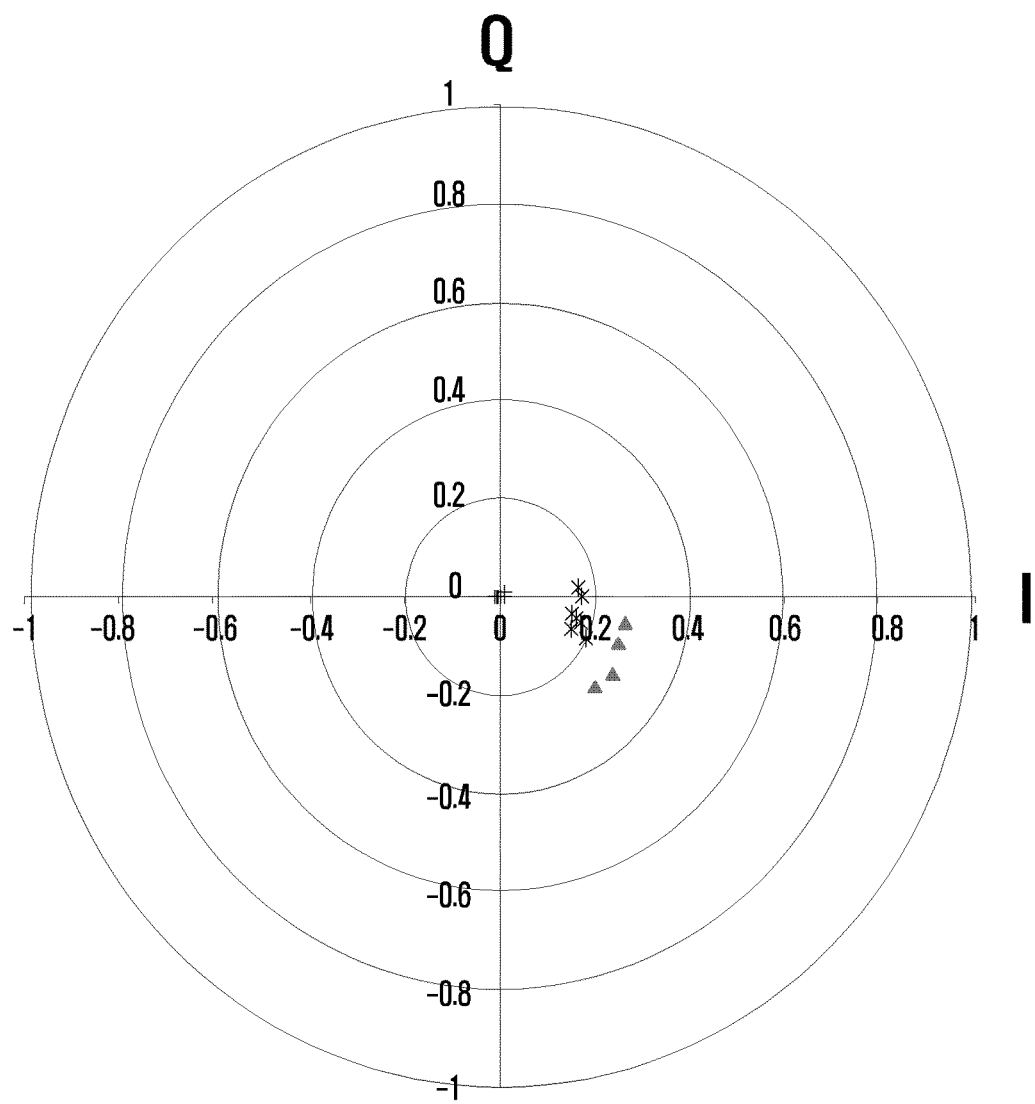
FIG. 5B is a diagram illustrating that reflection coefficients are plotted on a Smith chart.
Figure 5C:
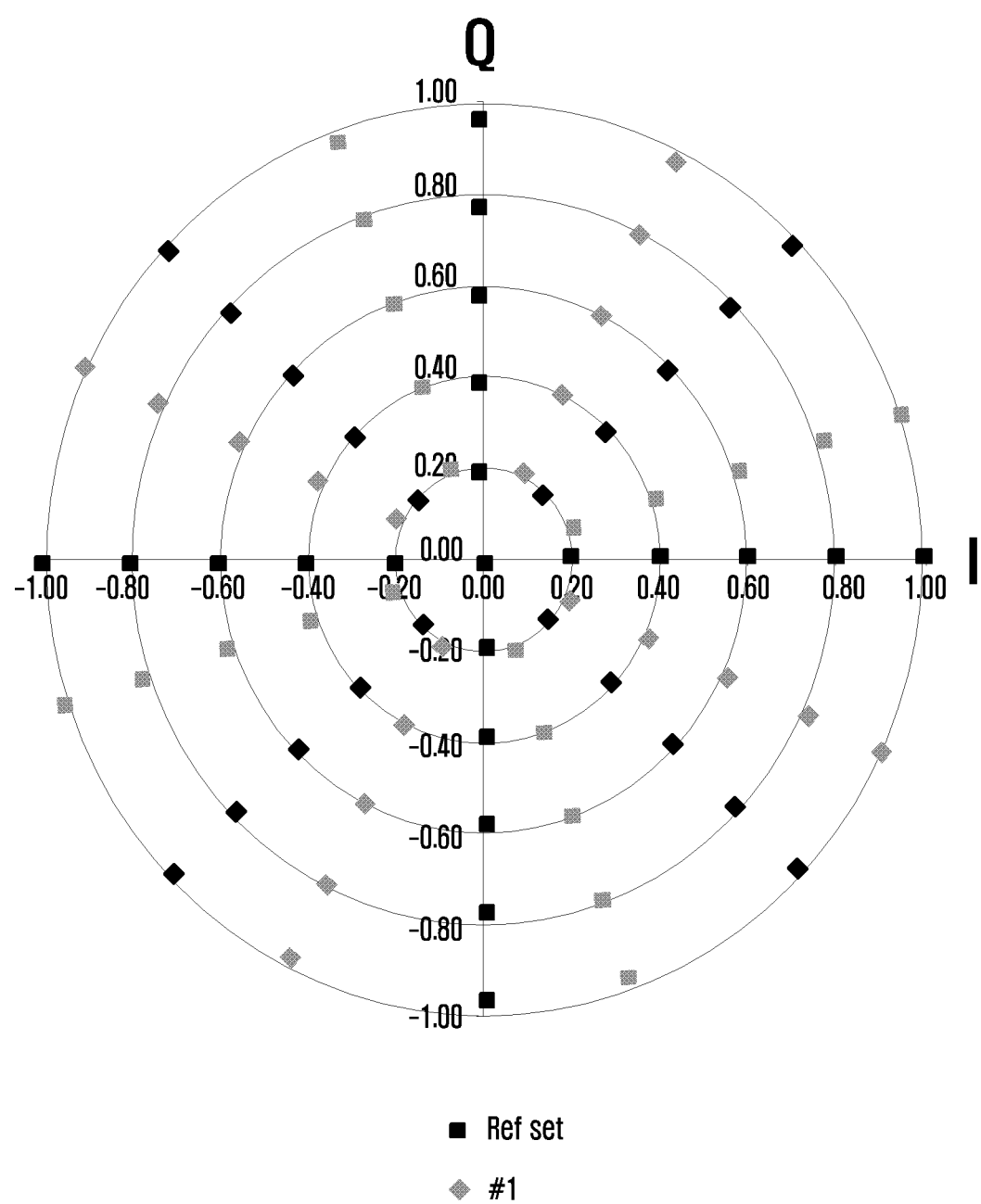
FIG. 5C is a diagram illustrating that reflection coefficients are plotted on a Smith chart.

FIGS. 5A to 5C are diagrams illustrating that reflection coefficients are plotted on a Smith chart.

The electronic device according to various embodiments of the disclosure may calculate the reflection coefficient (e.g., the ratio of a power reflected from the antenna to a power incident to the antenna) using a bidirectional coupler (e.g., coupler 430 of FIG. 4). For example, the reference (Ref) set, set #1 and set #2 may calculate the reflection coefficient for each Tx channel using the coupler. By plotting the calculated reflection coefficient on Smith chart, as illustrated in FIG. 5A, it may be identified that there is the phase deviation between the sets.

If the compensation value optimized to the reference set is applied to different sets (e.g., matching circuits 440 of the electronic device 400), as illustrated in FIG. 5B, the load impedance of the reference set may be plotted on a center point (e.g., characteristic impedance) of Smith chart, but the load impedance of set #1 and set #2 does not converge into the center point and it may be distributed in another region. That is, FIG. 5B may show that if the compensation value is applied to the impedance tuner of set #1 and set #2, the radiation performance may be rather deteriorated in contrast with the reference set

TABLE 1

| Set | Tx Channel | Normalized | | Reflection Coefficient | |
|-----|------------|------|------|-----------|-------|
|     |            | I    | Q    | Magnitude | Phase |
| Ref | 6150(832 Mhz) | −0.22 | 0.17 | 0.28 | 143 |
|     | 6200(837 Mhz) | −0.20 | 0.24 | 0.32 | 130 |
|     | 6250(842 Mhz) | −0.16 | 0.29 | 0.33 | 119 |
|     | 6300(847 Mhz) | −0.10 | 0.32 | 0.33 | 108 |
|     | 6350(852 Mhz) | −0.03 | 0.33 | 0.33 | 96 |
|     | 6400(857 Mhz) | 0.05 | 0.34 | 0.34 | 82 |
|     | 6450(862 Mhz) | 0.12 | 0.33 | 0.35 | 70 |
| #1  | 6150(832 Mhz) | −0.16 | 0.32 | 0.36 | 117 |
|     | 6200(837 Mhz) | −0.10 | 0.34 | 0.35 | 107 |
|     | 6250(842 Mhz) | −0.01 | 0.35 | 0.35 | 91 |
|     | 6300(847 Mhz) | 0.06 | 0.35 | 0.36 | 80 |
|     | 6350(852 Mhz) | 0.15 | 0.33 | 0.36 | 65 |
|     | 6400(857 Mhz) | 0.19 | 0.30 | 0.35 | 57 |
|     | 6450(862 Mhz) | 0.24 | 0.24 | 0.34 | 45 |
| #2  | 6150(832 Mhz) | −0.04 | 0.35 | 0.35 | 96 |
|     | 6200(837 Mhz) | 0.04 | 0.34 | 0.34 | 83 |
|     | 6250(842 Mhz) | 0.14 | 0.32 | 0.35 | 66 |

TABLE 1-continued

| Set | Tx Channel | Normalized | | Reflection Coefficient | |
|-----|------------|------|------|-----------|-------|
|     |            | I    | Q    | Magnitude | Phase |
|     | 6300(847 Mhz) | 0.19 | 0.28 | 0.34 | 56 |
|     | 6350(852 Mhz) | 0.23 | 0.22 | 0.32 | 44 |
|     | 6400(857 Mhz) | 0.26 | 0.17 | 0.31 | 33 |
|     | 6450(862 Mhz) | 0.27 | 0.13 | 0.30 | 26 |

Table 1 shows reflection coefficients (magnitude, phase, and corresponding load impedances (I (resistance) and Q (reactance)) measured for each Tx channel in the Ref set, set #1, and set #2 and plotted on Smith chart.

According to an embodiment, the phase value of the reference set may be included (stored) in the lookup table 451 as the reference value (reference phase information) for compensating for the phase shift of the electronic device (e.g., set #1 and set #2). For example, each phase value of the reference set may be stored as the reference value of the corresponding Tx channel. As another example, an average of at least two of the phase values of the reference set (e.g., "107" that is an average of 7 phase values) may be stored as the reference value.

According to another embodiment, the base plot domains variation-calibrated using the reference value may be included in the lookup table 451. For example, set #1 may obtain an average of at least two of its own phase values ("80" that is an average of 7 phase values), and it may obtain "27°" that is the phase difference through comparison of the average phase value with the reference value. As illustrated in FIG. 5C, set #1 may calibrate the base plot domains to suit set #1 through rotation of respective phases of the base plot domains clockwise by 27°. The calibrated base plot domains may be updated (e.g., in replacement of the existing reference compensation information) and included (e.g., stored) in the lookup table 451.

Figure 6:
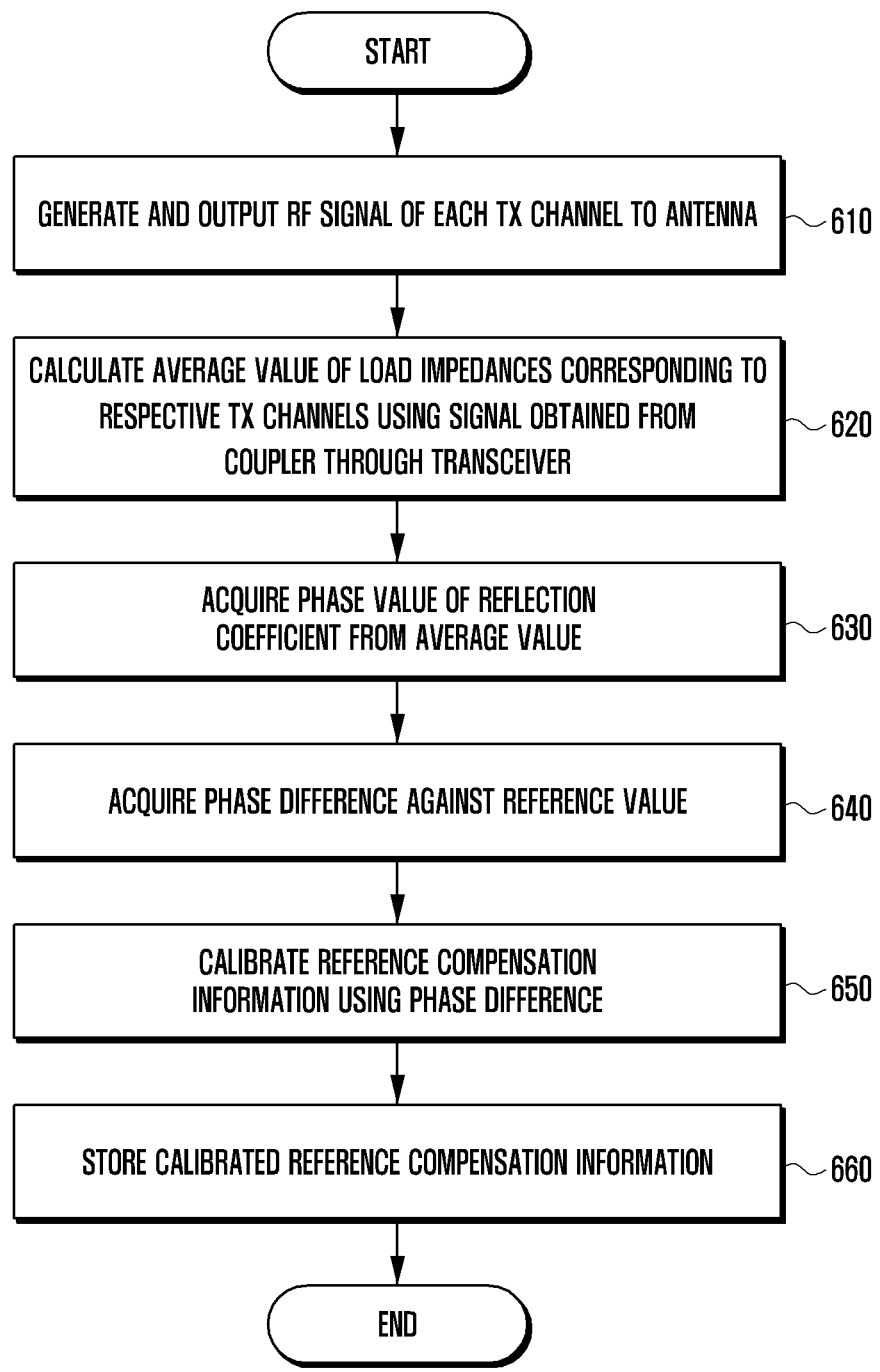
FIG. 6 is a flowchart explaining an electronic device calibration method according to various embodiments of the disclosure.

FIG. 6 is a flowchart explaining an electronic device calibration method according to various embodiments of the disclosure.

With reference to FIG. 6, at operation 610, the processor 460 may control the transceiver 421 to generate and output an RF signal of each Tx channel to the antenna 410.

At operation 620, the processor 460 may calculate the load impedance (I (resistance) and Q (reactance)) corresponding to each Tx channel using the forward coupling signal A and the backward coupling signal B obtained from the coupler 430 through the transceiver 421, and it may calculate an average value of at least two load impedances of each channel.

At operation 630, the processor 460 may acquire a phase value $$\left(\Gamma(\text{DUT\_phase}) = \tan^{-1}\left(\frac{\text{average Q}}{\text{average I}}\right)\right)$$

of the reflection coefficient from the average value.

At operation 640, the processor 460 may acquire the phase difference ($\Gamma$(DUT_phase)−$\Gamma$(Ref_phase)) against the reference value ($\Gamma$(Ref_phase)). As another example, the reference value may be a value input from an external device through a communication interface during calibration of the electronic device 400.

At operation 650, the processor 460 may calibrate the base plot domains to suit the electronic device 400 through shifting of the respective phases of the base plot domains (reference compensation information) as much as the phase difference.

At operation 660, the processor 460 may store the calibrated base plot domains in the lookup table 451.

Figure 7:
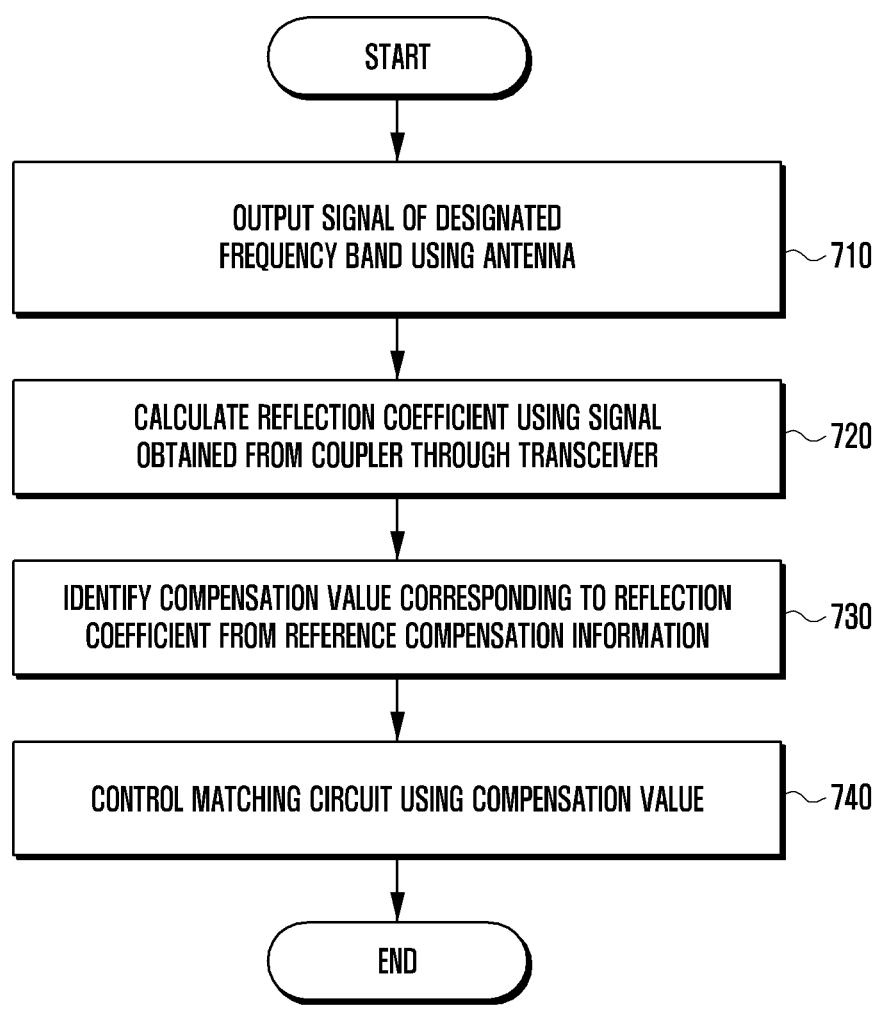
FIG. 7 is a flowchart explaining a radiation performance improvement method according to various embodiments of the disclosure.

FIG. 7 is a flowchart explaining a radiation performance improvement method according to various embodiments of the disclosure.

With reference to FIG. 7, at operation 710, the processor 460 may control the transceiver 421 to output a signal of a designated frequency band using the antenna 410. For example, the processor 460 may generate the RF signal of a specific Tx channel to output the generated RF signal to the antenna 410.

At operation 720, the processor 460 may calculate the reflection coefficient using the forward coupling signal and the backward coupling signal obtained by the coupler 430 through the transceiver 421.

At operation 730, the processor 460 may identify the domain (e.g., reflection coefficient) corresponding to the reflection coefficient from the reference compensation information (base plot domains) recorded in the lookup table 451, and it may identify the corresponding compensation value. Here, the base plot domains recorded in the lookup table 451 may be pre-calibrated through the method of FIG. 6.

At operation 740, the processor 460 may control the matching circuit 440 using the compensation value to adjust (or tune or transform) the load impedance (4) to converge into the specific impedance.

Figure 8:
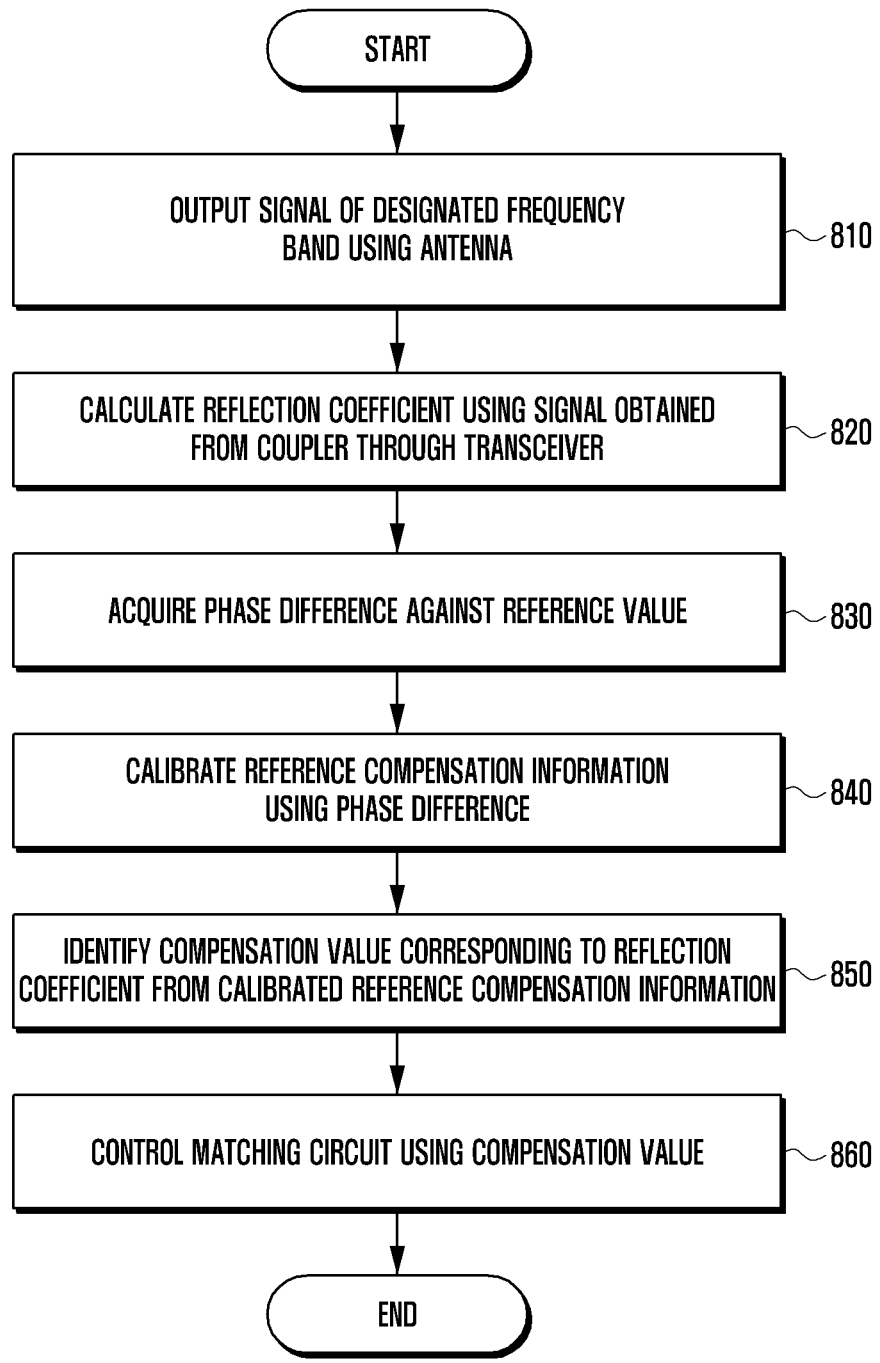
FIG. 8 is a flowchart explaining a radiation performance improvement method according to various embodiments of the disclosure.

FIG. 8 is a flowchart explaining a radiation performance improvement method according to various embodiments of the disclosure.

With reference to FIG. 8, at operation 810, the processor 460 may control the transceiver 421 to generate and output an RF signal of a specific Tx channel to the antenna 410.

At operation 820, the processor 460 may calculate the reflection coefficient using the forward coupling signal A and the backward coupling signal B obtained from the coupler 430 through the transceiver 421.

At operation 830, the processor 460 may acquire the phase difference ($\Gamma$(DUT_phase)–$\Gamma$(Ref_phase)) against the reference value ($\Gamma$(Ref_phase)). For example, the reference value may be a value pre-stored in the lookup table 451.

At operation 840, the processor 460 may calibrate the base plot domains (reference compensation information) to suit the electronic device 400 through shifting of the respective phases of the base plot domains as much as the phase difference.

At operation 850, the processor 460 may identify the domain corresponding to the calculated reflection coefficient among the calibrated base plot domains, and it may identify the corresponding compensation value in the lookup table 451.

At operation 860, the processor 460 may control the matching circuit 440 using the compensation circuit 440 to adjust (or tune or transform) the load impedance $Z_L$ to converge the characteristic impedance.

Figure 9:
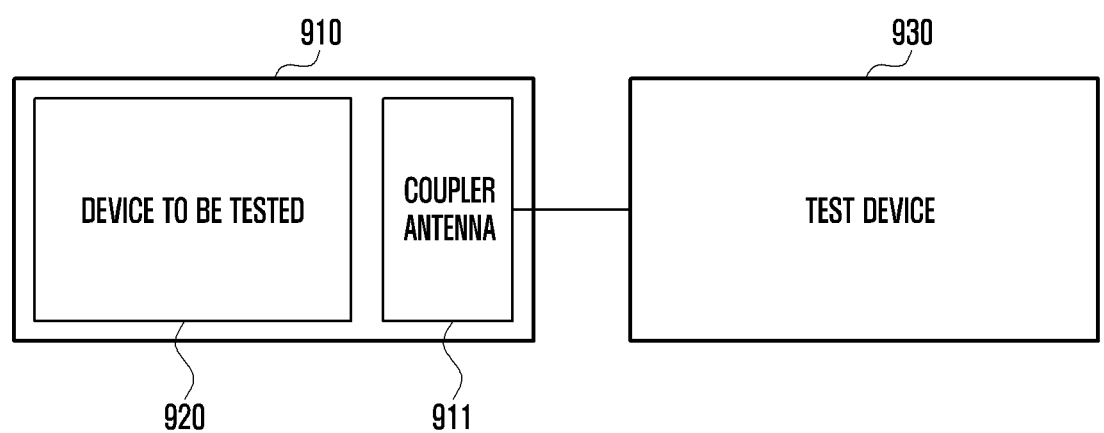
FIG. 9 is a diagram illustrating a configuration for testing an RF performance of an electronic device according to various embodiments of the disclosure.

FIG. 9 is a diagram illustrating a configuration for testing an RF performance of an electronic device according to various embodiments of the disclosure.

With reference to FIG. 9, a coupler antenna 911 may be installed on a jig 910 to be adjacent to an antenna of a device 920 to be tested (e.g., electronic device 400) seated on the jig 910, and it may act as an antenna for transmitting and receiving an RF signal with the tested device 920.

A test device 930 may be electrically connected to the coupler antenna 911 to receive the RF signal from the tested device 920 through the coupler antenna 911 and to transmit the RF signal to the tested device 920 through the coupler antenna 911, and through such RF communication, the test device 930 may test the RF performance (e.g., reception sensitivity and transmission power) of the tested device 920.

According to various embodiments of the disclosure, the tested device 920 in a state where it is seated on the jig 910 may perform conduction calibration for calibrating the characteristic of the wireless communication circuit (e.g., wireless communication circuit 420) so that a power satisfying the reference value is output through the antenna. For example, an electric contact (e.g., RF connector) may be formed between the antenna of the tested device 920 and the wireless communication circuit. After the tested device 920 is seated on the jig 910, the electric contact may be electrically connected to the test device 930 through a wire. Accordingly, the RF signal output from the wireless communication circuit may be output to the test device 930, and the RF signal output from the test device is output to the tested device, resulting in that the test device 930 may calibrate the characteristic of the wireless communication circuit of the tested device 920 using the RF signal.

According to various embodiments of the disclosure, after the conduction calibration, the tested device 920 may perform the radiation calibration in a state where it is seated on the jig 910. For example, after the completion of the conduction calibration, the wire connection between the tested device 920 and the test device 930 through the electric contact may be released. After the wire connection is released, the processor (e.g., processor 460) of the tested device 920 may calibrate the radiation performance deviation with the reference set using the forward coupling signal A extracted through the coupler (e.g., coupler 430). According to various embodiments of the disclosure, after the radiation calibration is completed, the tested device 920 seated on the jig 910 may perform RF communication with the test device 930 through the coupler antenna 911 to test the RF performance thereof.

According to various embodiments of the disclosure, an electronic device may include a transceiver; a power amplifier; at least one antenna; a coupler; a memory configured to store reference phase information; and a processor. The processor may be configured to: transmit an output signal of a designated frequency band using the transceiver, amplify the output signal using the power amplifier, radiate the amplified output signal through the at least one antenna, acquire the amplified output signal and a reflected signal obtained in the case where the amplified output signal is reflected by the at least one antenna through the coupler, identify a reflection coefficient based on the amplified output signal and the reflected signal, identify a difference value from reference phase information corresponding to the designated frequency band among the reference phase information based on phase information corresponding to the reflection coefficient, and compensate for another output signal to be transmitted through the transceiver at least based on the difference value.

The memory may store reference compensation information including a plurality of domains. The processor may be configured to update the reference compensation information through shifting of respective phases of the plurality of domains as much as the difference value as a part of the compensation operation.

The electronic device may further include a circuit for adjusting the impedance between the at least one antenna and the coupler.

The processor may be configured to adjust the impedance using the circuit as a part of the compensation operation.

The processor may be configured to: change reference compensation information stored in the memory to correspond to the reference phase information based on the difference value, identify a compensation value corresponding to another reflection coefficient acquired from the other output signal based on the changed reference compensation information, and control the circuit using the compensation value.

The changed reference compensation information may include a plurality of domains, compensation values respectively corresponding to the plurality of domains may be stored in the memory, and the processor may be configured to select the domain corresponding to a location of the other reflection coefficient plotted on a Smith chart among the plurality of domains based on the location, and control the circuit using the compensation value corresponding to the selected domain.

The processor may be configured to select the domain corresponding to the impedance.

The compensation value may be a value for the impedance to converge into a designated impedance (e.g., 50 ohms).

The circuit may include at least one of an impedance tuner or an aperture tuner.

The processor may be configured to control the circuit to make the impedance converge into a designated impedance.

According to various embodiments of the disclosure, an electronic device may include an antenna; a coupler; a circuit configured to adjust an impedance between the antenna and the coupler; a wireless communication circuit; a memory configured to store reference compensation information including a plurality of domains and compensated values corresponding to the plurality of domains, respectively; and a processor. The processor may be configured to: calculate a reflection coefficient by acquiring, through the coupler, a signal output from the wireless communication circuit to the antenna and a signal reflected from the antenna, identify the domain corresponding to the reflection coefficient from the reference compensation information, identify the compensated value corresponding to the domain from the memory, and control the circuit using the compensated value.

The compensation value may correspond to the reflection coefficient, and it may be a value for the impedance of the antenna to converge into a designated impedance (50 ohms).

The circuit may include at least one of an impedance tuner or an aperture tuner.

The processor may be configured to select at least one of the plurality of domains based on a location of the reflection coefficient plotted on a Smith chart.

The processor may be configured to select the domain corresponding to the location.

According to various embodiments of the disclosure, a method for compensating for a signal output to an antenna of an electronic device may include acquiring, through a coupler, phase information from a signal output from a transceiver of the electronic device to the antenna and a signal reflected by the antenna; identifying a difference value between the phase information and reference phase information stored in a memory; and compensating for another signal to be output from the transceiver to the antenna at least based on the difference value.

The electronic device may store reference compensation information, and compensating may include updating the reference compensation information through shifting of respective phases of the plurality of domains as much as the difference value as a part of the compensation operation.

Acquiring may include calculating impedances between the antenna and the coupler, corresponding to the respective frequency bands, using the signal output to the antenna and the signal reflected from the antenna for designated frequency bands; calculating an average value of at least two of the calculated impedances; and acquiring the phase information of a reflection coefficient from the average value.

Compensating may include controlling a circuit for adjusting the impedance between the antenna and the coupler.

Embodiments disclosed in this specification and drawings are illustrated to present only specific examples in order to clarify the technical contents and help understanding of the disclosure, but are not intended to limit the scope of the disclosure. It should be interpreted that all changes or modifications derived based on the technical idea of various embodiments of the disclosure in addition to the embodiments disclosed herein may be included in the scope of the various embodiments of the disclosure.

The invention claimed is:

1. An electronic device comprising:
a transceiver;
a power amplifier;
at least one antenna;
a coupler;
a circuit configured to adjust an impedance between the at least one antenna and the coupler;
a memory configured to store reference phase values; and
a processor,
wherein the processor is configured to:
transmit an output signal of a designated frequency band using the transceiver,
amplify the output signal using the power amplifier,
radiate the amplified output signal through the at least one antenna,
acquire the amplified output signal and a reflected signal obtained in a case where the amplified output signal is reflected by the at least one antenna through the coupler,
identify a reflection coefficient including a phase value, based on the amplified output signal and the reflected signal,
select a reference phase value corresponding to the designated frequency band among the reference phase values stored in the memory,
identify a phase difference value between the identified phase value and the selected reference phase value,
change reference compensation information stored in the memory to correspond to the selected reference phase value based on the phase difference value,
identify a compensation value corresponding to another reflection coefficient acquired from the other output signal based on the changed reference compensation information, and
control the circuit using the compensation value.

2. The electronic device of claim 1, wherein the reference compensation information includes a plurality of domains, and
the processor is configured to update the reference compensation information through shifting of respective phases of the plurality of domains as much as the phase difference value as a part of the changing operation.

3. The electronic device of claim 1,
wherein the processor is configured to adjust the impedance using the circuit as a part of the control operation.

4. The electronic device of claim 1, wherein the changed reference compensation information comprises a plurality of domains,
   compensation values respectively corresponding to the plurality of domains are stored in the memory, and
   the processor is configured to select the domain corresponding to a location of the other reflection coefficient plotted on a Smith chart among the plurality of domains based on the location, and control the circuit using the compensation value corresponding to the selected domain.

5. The electronic device of claim 1, wherein the compensation value is a value for the impedance to converge into a designated impedance.

6. The electronic device of claim 1, wherein the circuit comprises at least one of an impedance tuner or an aperture tuner.

7. The electronic device of claim 1, wherein the processor is configured to control the circuit to make the impedance converge into a designated impedance.

8. The electronic device of claim 7, wherein the designated impedance is 50 ohms.

9. A method for compensating for a signal output to an antenna of an electronic device, comprising:
   identifying, using a coupler, a reflection coefficient including a phase value from a signal of a designated frequency band output from a transceiver of the electronic device to the antenna and a signal reflected by the antenna;
   selecting a reference phase value corresponding to the designated frequency band among reference phase values stored in a memory of the electronic device;
   identifying a phase difference value between the acquired phase value and the selected reference phase value;
   changing reference compensation information stored in the memory to correspond to the selected reference phase value based on the phase difference value;
   identifying a compensation value corresponding to another reflection coefficient acquired from the other output signal based on the changed reference compensation information; and
   controlling a circuit using the compensation value, the circuit configured to adjust an impedance between the antenna and the coupler.

* * * * *